US008456476B1

(12) United States Patent
Kovar et al.

(10) Patent No.: US 8,456,476 B1
(45) Date of Patent: Jun. 4, 2013

(54) PREDICTING CONSTRAINT ENFORCEMENT IN ONLINE APPLICATIONS

(75) Inventors: Lucas A. Kovar, San Francisco, CA (US); Rachel M. Rose, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 572 days.

(21) Appl. No.: 12/343,637

(22) Filed: Dec. 24, 2008

(51) Int. Cl.
*G06T 13/00* (2006.01)
(52) U.S. Cl.
USPC ............................................................ 345/474
(58) Field of Classification Search
USPC .................................................. 345/474, 473
See application file for complete search history.

(56) References Cited

U.S. PATENT DOCUMENTS

| | | | | |
|---|---|---|---|---|
| 6,738,065 | B1 * | 5/2004 | Even-Zohar | 345/473 |
| 7,202,869 | B2 * | 4/2007 | Tooley et al. | 345/473 |
| 2008/0215974 | A1 * | 9/2008 | Harrison et al. | 715/706 |

OTHER PUBLICATIONS

Tak Seyoon et al (Spacetime Sweeping: An interactive Dynaimc Constraints Solver, 2002, IEEE).*
Lucas Kovar et al (Footskate Cleanup for Motion Capture Editing, 2002, ACM SIGGRAPH).*
Lee et al. (A Hierarchical Approach to Interactive Motion Editing for Human-like Figures, ACM SIGGRAPH, 1999).*
Perlin et al. (Improv: A System for Scripting Interactive Actors in Virtual Worlds, ACM SIGGRAPH, 1996).*
Kovar et al. (Footskate Cleanup for Motion Capture Editing, ACM SIGGRAPH, 2002).*
Choi, et al. "On-Line Motion Retargeting", Journal of Visualization and Computer Animation , vol. 11, Issue 5, Dec. 2000, 11 pages.
Gleicher, "Motion Editing with Spacetime Constraints", Proceedings of the 1997 symposium on Interactive 3D graphics, 1997, 10 pages.
Gleicher, "Retargetting Motion to New Characters", Proceedings of the 25th annual conference on Computer graphics and interactive techniques, 1998, 10 pages.
Hecker, "Real-time motion retargeting to highly varied user-created morphologies", ACM Transactions on Graphics (TOG), vol. 27 Issue 3, Aug. 2008, 11 pages.
Kovar, et al. Footskate Cleanup for Motion Capture, Proceedings of the 2002 ACM SIGGRAPH/Eurographics symposium on Computer animation , 2002, 8 pages.
Lee, A Hierarchical Approach to Interactive Motion Editing for Human-Like Figures, Proceedings of the 26th annual conference on Computer graphics and interactive techniques, 1999, 10 pages.
Shin, et al. "Computer Puppetry: an Importance-Based Approach", ACM Transactions on Graphics, vol. 20 Issue 2, Apr. 2001, 28 pages.

\* cited by examiner

*Primary Examiner* — Ke Xiao
*Assistant Examiner* — Kyle Zhai

(57) ABSTRACT

A computer-implemented method includes identifying a primary node that represents a first pose of an online character. The first pose is associated with a constraint being inactive. The method also includes identifying the primary node representing a second pose of the online character. The second pose is associated with the constraint being active. The method also includes calculating the difference between the primary node of the second pose and the primary node of the first pose. Further, the method includes applying the difference to the primary node of the first pose.

30 Claims, 6 Drawing Sheets

PREDICTING CONSTRAINT ENFORCEMENT IN ONLINE APPLICATIONS

TECHNICAL FIELD

This document relates to predicting the enforcement of kinematic constraints in online application such as online motion synthesis.

BACKGROUND

In offline applications such as movie production, character movements can be smoothly choreographed since the character poses are known in advance for each moment of the movie. For online applications such as video games, character poses are dynamically generated "on the fly" (e.g., based on user input) and are not easily pre-determined. Further, techniques for constructing and editing character movement (e.g., displacement maps, retargeting and blending) can introduce or exacerbate imprecise relationships between characters and environmental conditions.

SUMMARY

The systems and techniques described here relate to predicting constraints for adjusting online characters.

In one aspect, a computer-implemented method includes identifying a primary node that represents a first pose of an online character. The first pose is associated with a constraint being inactive. The method also includes identifying the primary node representing a second pose of the online character. The second pose is associated with the constraint being active. The method also includes calculating the difference between the primary node of the second pose and the primary node of the first pose. Further, the method includes applying the difference to the primary node of the first pose.

Implementations may include any or all of the following features. The method may also include identifying the active constraint associated with the second pose. Identifying the primary node of the first pose may include determining if the node is overlaid, fading out, or other similar condition. The primary node may include multiple nodes, such as a first and a second node. In such as implementation, the first node may represent a first activity of the online character and the second node represents a second activity of the online character, in which the activities may occur substantially simultaneously in time. The first pose may occur at a first time and the second pose may occur at a second time, which may be later than the first time. Identifying the primary node may include selecting a node from a plurality of nodes representing the first pose. The primary node may represent movement of the online character or other characteristic. The online character may be included in a video game or other similar online environment.

In another aspect, a system includes a pose predictor for identifying a primary node representing a first pose of an online character. The first pose is associated with a constraint being inactive. The pose predictor is configured to identify the primary node representing a second pose of the online character. The second pose is associated with the constraint being active. The pose predictor is also configured to calculate the difference between the primary node of the second pose and the primary node of the first pose. The pose predictor is further configured to apply the difference to the primary node of the first pose.

In another aspect, a computer program product tangibly embodied in an information carrier and comprising instructions that when executed by a processor perform a method that includes identifying a primary node representing a first pose of an online character. The first pose is associated with a constraint being inactive. The method also includes identifying the primary node representing a second pose of the online character. The second pose is associated with the constraint being active. The method also includes calculating the difference between the primary node of the second pose and the primary node of the first pose. The method further includes applying the difference to the primary node of the first pose.

Details of one or more implementations are set forth in the accompanying drawings and the description below. Other features, aspects and advantages will be apparent from the description and drawings, and from the claims.

DESCRIPTION OF DRAWINGS

Like reference symbols in the various drawings indicate like elements.

DETAILED DESCRIPTION

Figure 1:
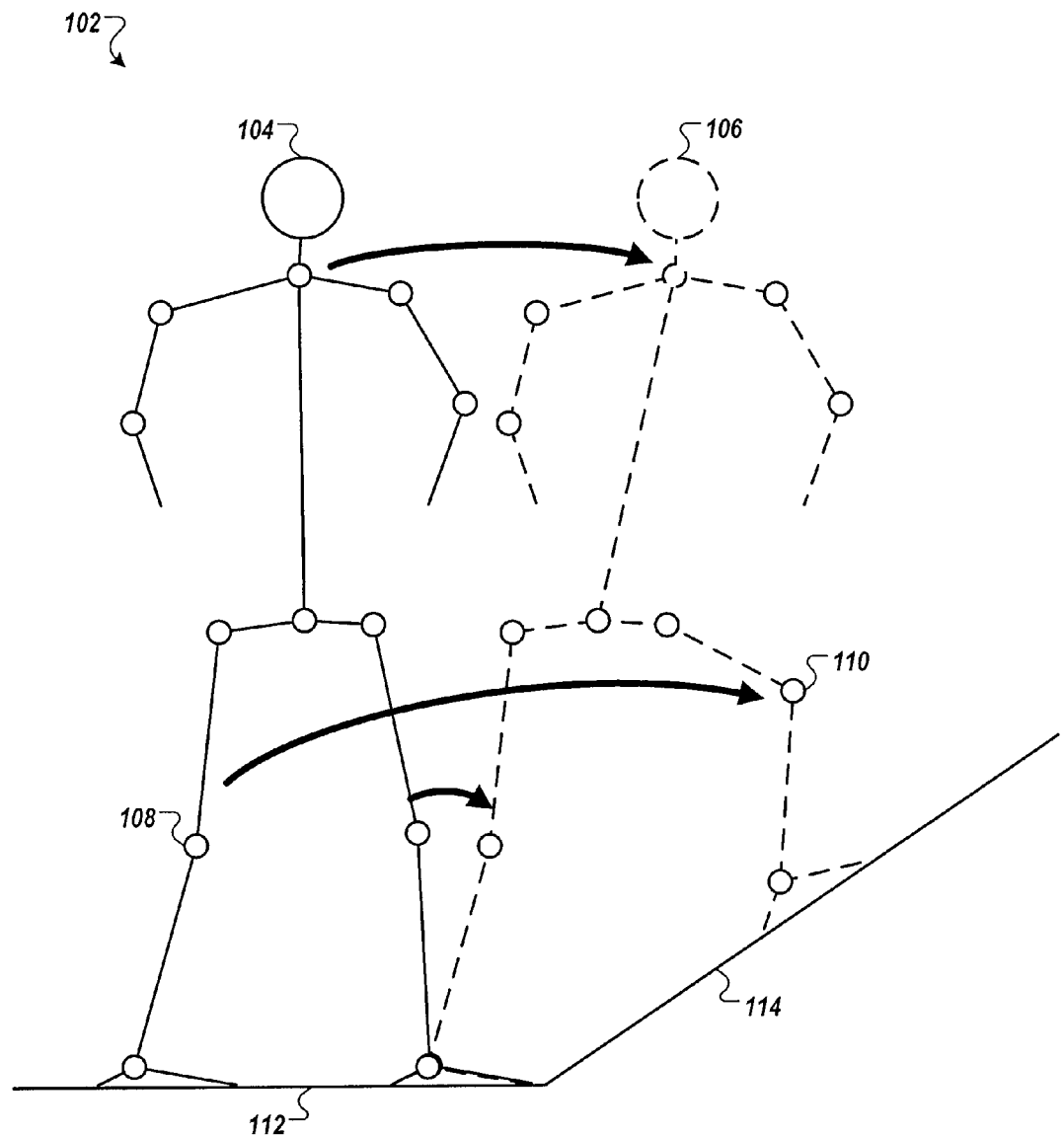
FIG. 1 illustrates an online character.

Referring to FIG. 1, a FIG. 102 represents an online character. For purposes of this document, an online character refers to a character who's past actions can be known but who's future actions can be considered unknown. In some implementations, FIG. 102 can be a playable character in a video game or virtual world, a character in an animation movie that includes user input, an object in a mathematical simulation or other similar object of character.

A pose 104 can be considered as a first pose of the FIG. 102 and can represent the FIG. 102 as currently displayed. For example, in a video game a user pressing forward on a joystick input can cause the FIG. 102 to walk forward. The pose 104 can be shown in the video game's current video output. In this example, the pose 104 represents the character 102 as standing on a level surface 112. In some implementations, walking animations can be created for flat surfaces, so no constraints are placed on pose 104.

A pose 106 can be considered a second pose of the FIG. 102 and represents the figure as it can be displayed in the future or an approximation of the FIG. 102 as it can be displayed in the future. For example, in a video game application, a user that is pressing forward on a joystick may continue to press forward on the joystick. In this case, the FIG. 102 can eventually be displayed in or nearly in the pose 106 (based upon this user input).

In this example, the pose 106 represents the FIG. 102 partially standing on an incline surface 114. In some implementations, walking animations can be created for flat surfaces, so a constraint can be applied to pose 106 which can allow the pose 106 to appear to be standing on the incline surface 114. For example, a human character's forward foot can be raised to the level of the incline and the ankle, knee and back can be bent to fit the constraint of the incline surface.

Figure 2:
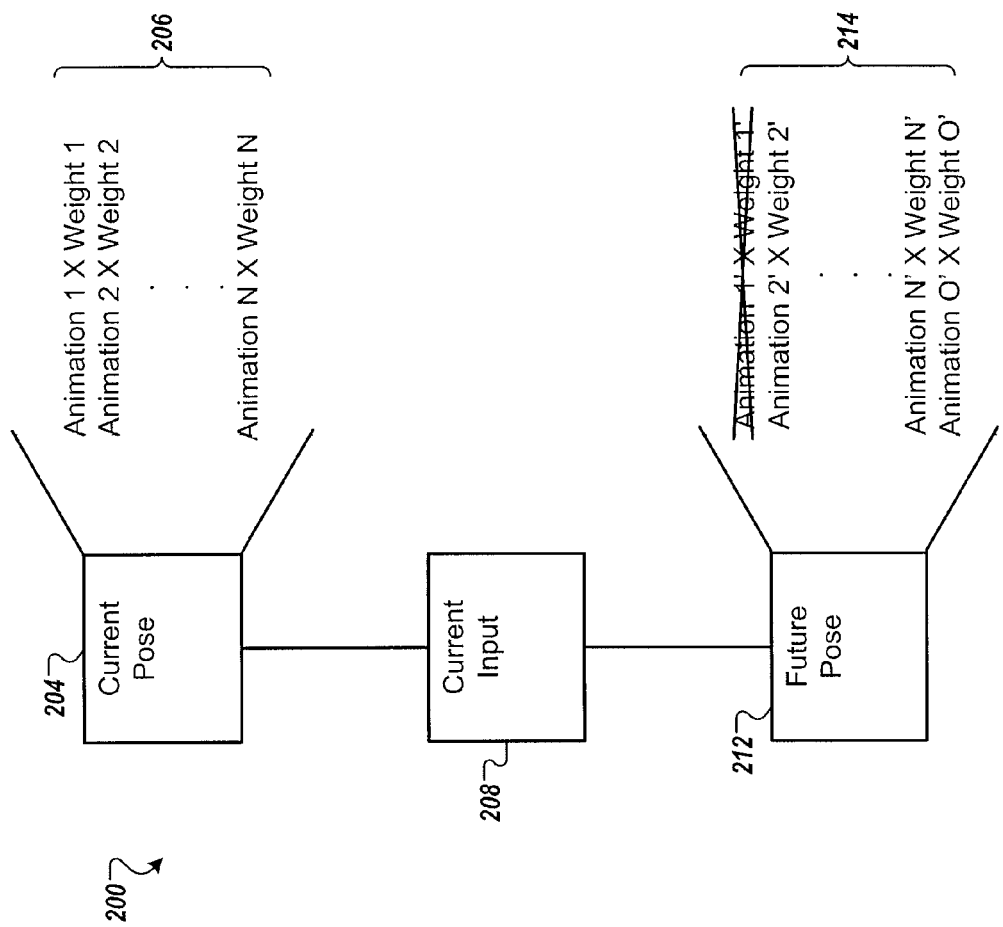
FIG. 2 illustrates a block diagram of a data structure.

Referring to FIG. 2, a block diagram of a data structure 200 is shown that can be used to contain information related to the current pose 104 and the future pose 106 of the FIG. 102 such as previously described.

A current pose 204 can represent a current pose of a figure such as the current pose 104 of the FIG. 102 (shown in FIG. 1). In some implementations, the current pose 204 can include a collection of nodes 206 that represent various aspects of the pose.

In some implementations, the nodes 206 can be created by taking an animation at a particular frame and applying a weight to the frame of animation. The nodes 206 can include use other nodes 206 (e.g., representative of other poses) that may or may not be directly associated with animation, for example, one node may be associated with a single posture of a character standing in place, and another node may be associated with band-limited noise to breathing simulation. In some implementations, some or all nodes 206 can be classified into categories. In one example, animation nodes that interpolate a set of related movements to produce a continuous range of variation. In another example, transition nodes can smoothly shift the weight from one node to another. In another example, overlay nodes can replace or partially replace degrees of freedom in one node with those in another.

In some implementations, more than one node can be used to create a pose that a single animation would be unable to produce on its own. For example, a figure can be directed to run at 2 meters/second and the only available running animations may correspond to speeds of 1 meter/second and 3 meters/second. By weighing the two available running animations equally and combining the two nodes, a running pose of 2 meters/second can be created. Different weight value ratios can be used to produce different running speeds. In another example, user input may direct the FIG. 102 to reach diagonally forward and to the right. Animations are available to reach either directly forward or directly to the right. To achieve the desired motion, these two animations can be combined with different weights to create a pose that reaches at an angle between directly forward and directly to the right.

A current input 208 can be an input that can affect an online character. In some implementations, the current input 208 can include user input initiated from a keyboard, mouse, gamepad and/or other device. The user input 208 can be of a type that is not predictable or can be subject to change. For example, a user controlling a character in a video game may choose to change the direction of the character at any time. Since the future actions of a user in this example may be difficult or impossible to predict, current input 208 may only be used. Future inputs, such as that which may be available in, for example, a movie making processes, may not be available.

A future pose 212 can represent a possible pose of the FIG. 102. In some implementations, the future pose 212 can be based in part or in whole on the current pose 204 and/or the current input 208. The future pose 212 can include a collection of nodes 214. The nodes 214, like the nodes 206, can be created by taking an animation at a particular frame and applying a weight to the frame of the animation. The future pose 212 can include more, fewer, or different nodes 214 than the current nodes 206. For example, the node 206 can relate to a standing idle animation that might include shuffling feet. The input 208 can direct a figure to begin running, in which case there may be no future node 206 related to the standing idle. Similarly, a new future node 214 can be introduced if a future animation can be needed, such as heavy breathing if the figure has run for a long time.

In some implementations, a primary node can be identified from the current nodes 206 and/or future nodes 214. A primary node can be thought of as the base animation that can be applied to a figure. In some implementations, a primary node can be a node that is not fading out or having its weight reduced. In one example, an animation 1 can be fading out, such as an idle animation for a character that begins to walk forward. The animation 1 may have a positive weight in the current node 206 which is reduced to a lower or zero value by the time of the future node 214. In this example, the animation 1 can not be a primary node. In another example, an animation 2 can have the same weight in the current node 206 as in the future node 214, such as a character walking forward. In this example, animation 2 can be a primary node.

In some implementations, a primary node can include more than one node. In one example, a first current node 206 can include animation for walking forward and a second current node 206 can include animation for carrying an object, such as a character walking in one direction and aiming a weapon at different points in the environment. If the animation for both of these current nodes 206 can be executed simultaneously, they can both be included in a primary node. In some implementations, primary nodes can include more than one node of which some or all of the nodes are not fading out.

Figure 3:
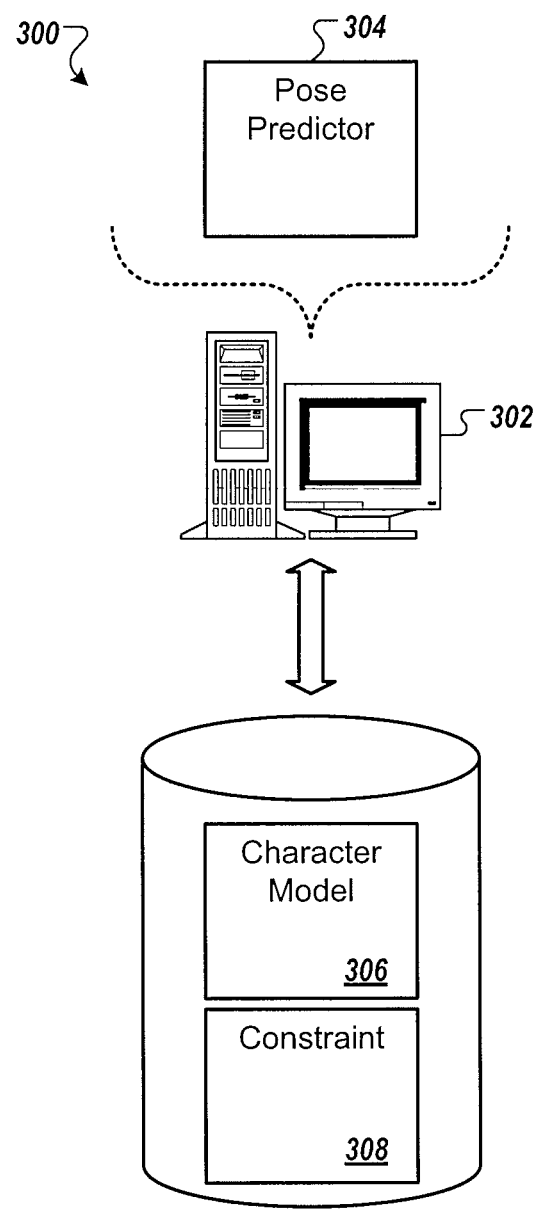
FIG. 3 illustrates a block diagram of a computer system.

Referring to FIG. 3, a block diagram of a system 300 is shown that includes a computer system 302 that is capable of producing an online environment such as a computer game, virtual world, or other simulation. A pose predictor 304 can be an object, such as a hardware module or software program (or a combination of hardware and software), that can predict a future posed of a character model 306. The character model 306 can be a model found in an online world. An exemplary constraint 308 can represent one or more limitations that may be imposed upon the character model 306 due to its interactions with the online environment.

Figure 4:
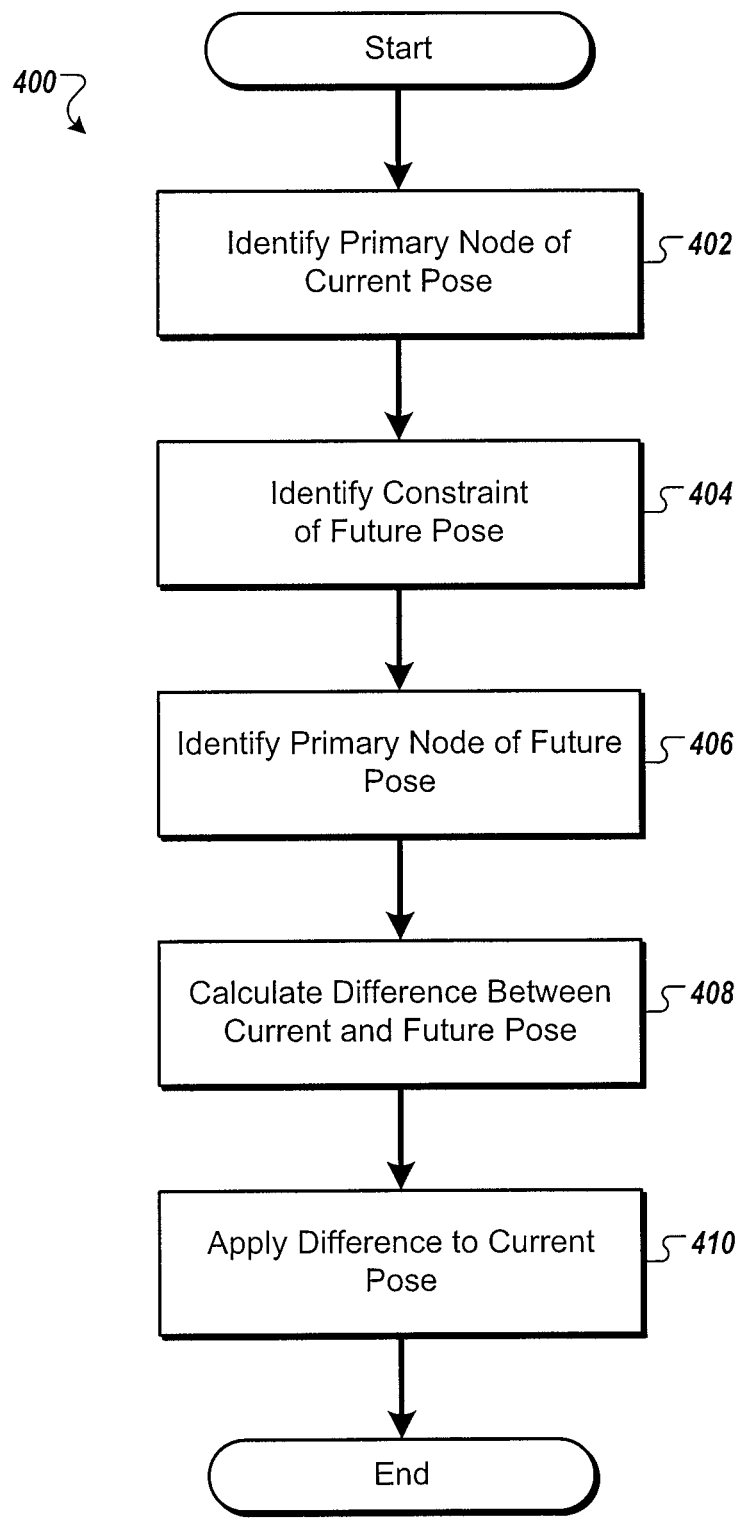
FIG. 4 is a flowchart of operations of animating an online character.

Referring to FIG. 4, a flowchart 400 represents some of the operations of the pose predictor 304 for animating an online character. Along with being executed at a single site (e.g., at one computer system), operation execution may be distributed among two or more sites.

Operations include identifying 402 a primary node of a current pose of an online character model 308. In some implementations, a primary node can be related to an animation that can be applied to the online character model 306. In some implementations, the primary node can be a base pose of the character model 306. Additional animation can added, or overlaid, to the primary node, but the primary node can be an animation that is not overlaid on another animation.

In some implementations, the primary node can be an animation that is not fading out. A node that is fading out can represent an animation that is ending, such as the idle standing animation on a character that begins walking. In some implementations, the primary node can include one or more nodes. A primary node that includes more than one node can represent an two activities taken by an online character at the same time.

For example, the character model 306 can perform a walking animation that involves moving the legs, feet, and hips and can also perform a conversation animation that involves moving arms and facial features.

Operations include identifying 404 a constraint to a future pose of the character model 306. In some implementations, the character model 306 can perform an animation that will lead it into a situation in which the constraint 308 will apply to a future predicted pose. For example, a human character walking up an incline of a hill can not take each step on the same level and is constrained to only put each foot as low as the terrain allows. In another example, a car that pulls too close to a wall can not open the door on the side adjacent to the wall.

Operations may also include identifying 406 a primary node of a future pose of the online character model 306. A primary node of a future or predicted pose can be found in a similar or in the same manor as identifying 402 the primary node of the current pose.

Operations may also include calculating 408 the difference between a current and a future pose. In some implementations, only the difference between a current primary node and a future primary node may be found. This can result in a future pose that is an approximation instead of a perfect prediction due to not accounting for the difference in non-primary nodes.

In some examples, a future pose may have nodes with the same animations and different weights associated. The difference between these two weights can be calculated using factors such as the constraints 308 applied to the future pose. In some examples, a future pose may include fewer or more nodes, and the presence or absence of these nodes can be included in differences between a current and future pose. Further, in some implementations, calculated quantities may be approximated to reduce processing and memory resources.

Operations also include applying 310 the difference to a current pose of the character model 306. In some implementations, this can include changing the weight of a current node or nodes to that of a future node. In some implementations, only the difference between current primary and future primary nodes are known and only the primary nodes may have the differences applied.

Figure 5:
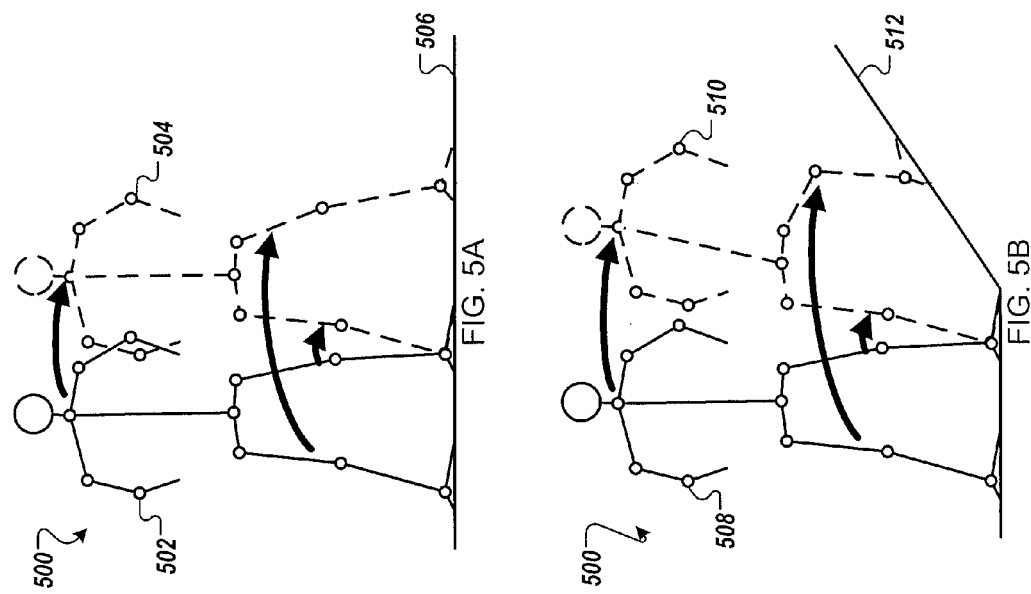
FIG. 5 illustrates an online character with a current pose and a future pose.

Referring to FIG. 5A, an online character 500 with a current pose 502 and a future pose 504 is shown. In this example, the character is illustrated as walking across a flat surface 506 because a user input for forward motion has been detected. In this example, the flat surface can be next to an inclined surface such as the valley between two hills.

FIG. 5B shows the online character 500 with both a current pose 508 and a future pose 510, responding to a user input to turn to the left. In the example of the figure is represented as walking in a valley, and a turn to the left can result in the character walking up the hill 512.

As the character makes a smooth turn from the level ground of the valley to the slope of the hill, the constraint imposed by the hill 512 changes in a substantially similarly smooth manner. The smooth change in the constraint results in a substantially similarly smooth change to the future pose 510. In this way, the motion of the FIG. 500 can be ensured to be smooth and fluid looking and can be ensured to always be correctly affected by constraints applied to the FIG. 500.

Figure 6:
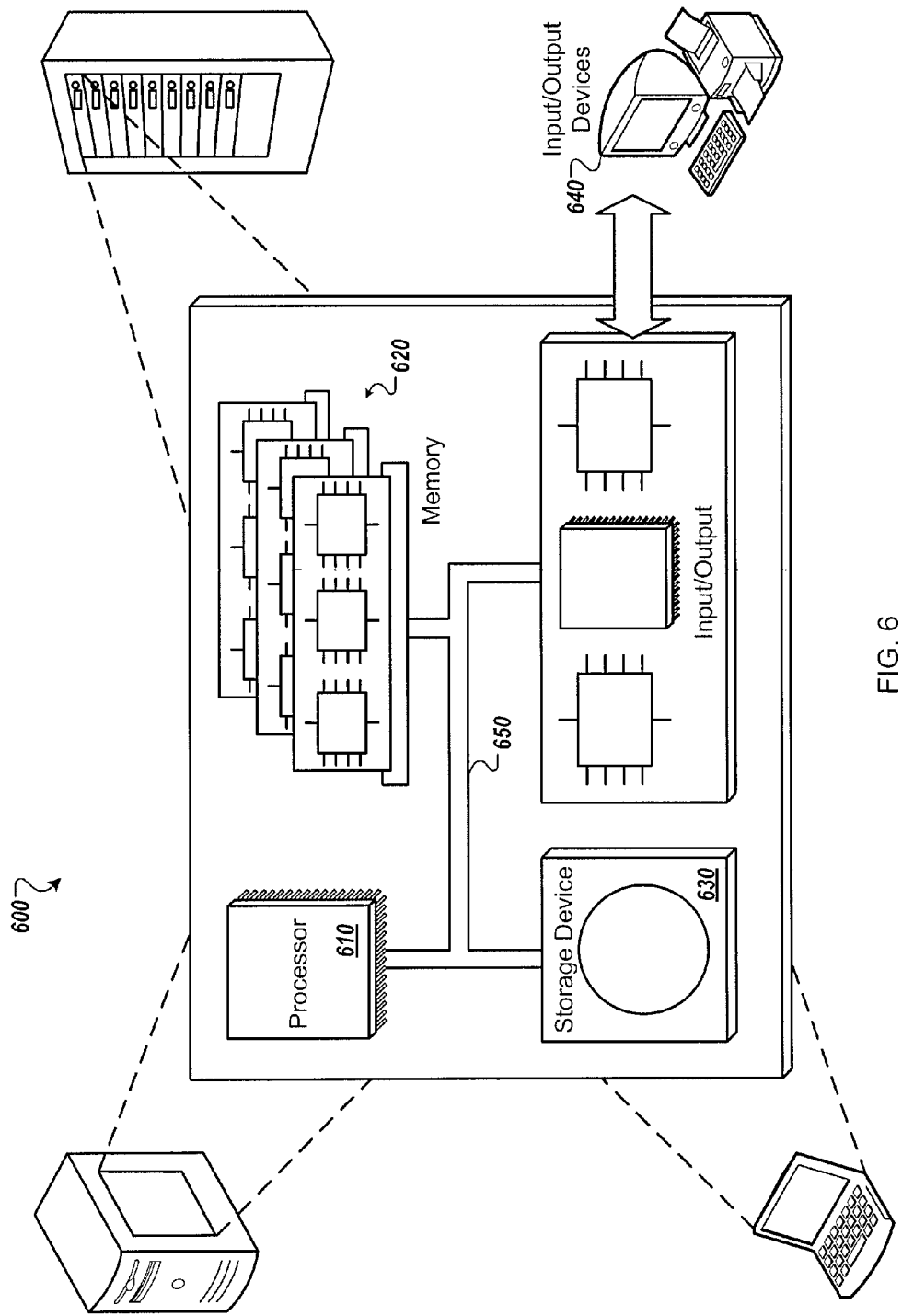
FIG. 6 illustrates a schematic diagram of an example of a generic computer system.

Referring to FIG. 6, a schematic diagram is shown of an example of a generic computer system 609. The system 690 can be used for the operations described in association with the flowchart according to one implementation. For example, the system 600 may be included in computer system 302.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

A number of implementations have been described. Nevertheless, it will be understood that various modifications may be made without departing from the spirit and scope of the following claims.

What is claimed is:

1. A computer-implemented method comprising:
   identifying, on a processor, a primary node representing a first pose of an online character and a non-fading animation characteristic of the online character, and, identifying a non-primary node representing a fading animation characteristic of the online character, wherein the first pose is associated with a constraint being inactive;
   identifying the primary node representing a second pose of the online character and the non-fading characteristic, wherein the second pose is associated with the constraint being active, and wherein the second pose is defined, at least in part, by a user-input that affects an action of the online character;
   calculating a difference between the primary node of the second pose and the primary node of the first pose, wherein the non-primary node is absent from calculating the difference; and
   applying the difference to the primary node of the first pose, wherein the non-primary node is absent from applying the difference.

2. The computer-implemented method of claim 1, further comprising:
   identifying the active constraint associated with the second pose.

3. The computer-implemented method of claim 1, wherein identifying the primary node of the first pose includes determining if the node is overlaid.

4. The computer-implemented method of claim 1, wherein identifying the primary node of the first pose include determining if the node is fading out.

5. The computer-implemented method of claim 1, wherein the primary node includes a first and a second node.

6. The computer-implemented method of claim 5, wherein the first node represents a first activity of the online character and the second node represents a second activity of the online character, wherein the first activity and the second activity occur substantially simultaneously in time.

7. The computer-implemented method of claim 1, wherein the first pose occurs at a first time and the second pose occurs at a second time, later than the first time.

8. The computer-implemented method of claim 1, wherein identifying the primary node includes selecting a node from a plurality of nodes representing the first pose.

9. The computer-implemented method of claim 1, wherein the primary node represents movement of the online character.

10. The computer-implemented method of claim 1, wherein the online character is included in a video game.

11. A system comprising:
    a computing device comprising:
    a pose predictor for identifying a primary node representing a first pose of an online character and a non-fading animation characteristic of the online character, and, identifying a non-primary node representing a fading animation characteristic of the online character, wherein the first pose is associated with a constraint being inactive, the pose predictor is configured to identify the primary node representing a second pose of the online character and the non-fading characteristic, wherein the second pose is associated with the constraint being active, and wherein the second pose is defined, at least in part, by a user-input that affects an action of the online character, the pose predictor is also configured to calculate a difference between the primary node of the second pose and the primary node of the first pose, wherein the non-primary node is absent from calculating the difference, the pose predictor is further configured to apply the difference to the primary node of the first pose, wherein the non-primary node is absent from applying the difference.

12. The system of claim 11, wherein the pose predictor is configured to identify the active constraint associated with the second pose.

13. The system of claim 11, wherein the pose predictor is configured to determine if the node is overlaid for identifying the primary node of the first pose.

14. The system of claim 11, wherein the pose predictor is configured to determine if the node is fading out for identifying the primary node.

15. The system of claim 11, wherein the primary node includes a first and a second node.

16. The system of claim 15, wherein the first node represents a first activity of the online character and the second node represents a second activity of the online character, wherein the first activity and the second activity occur substantially simultaneously in time.

17. The system of claim 11, wherein the first pose occurs at a first time and the second pose occurs at a second time, later than the first time.

18. The system of claim 11, wherein the pose predictor is configured to select a node from a plurality of nodes representing the first pose for identifying the primary node.

19. The system of claim 11, wherein primary node represents movement of the online character.

20. The system of claim 11, wherein the online character is included in a video game.

21. A computer program product tangibly embodied in a memory device and comprising instructions that when executed by a processor perform a method comprising:
    identifying a primary node representing a first pose of an online character and a non-fading animation characteristic of the online character, and, identifying a non-primary node representing a fading animation characteristic of the online character, wherein the first pose is associated with a constraint being inactive;

identifying the primary node representing a second pose of the online character and the non-fading characteristic, wherein the second pose is associated with the constraint being active, and wherein the second pose is defined, at least in part, by a user-input that affects an action of the online character;

calculating a difference between the primary node of the second pose and the primary node of the first pose, wherein the non-primary node is absent from calculating the difference; and applying the difference to the primary node of the first pose, wherein the non-primary node is absent from applying the difference.

22. The computer program product of claim 21, wherein the method further comprises:

identifying the active constraint associated with the second pose.

23. The computer program product of claim 21, wherein identifying the primary node of the first pose includes determining if the node is overlaid.

24. The computer program product of claim 21, wherein identifying the primary node of the first pose include determining if the node is fading out.

25. The computer program product of claim 21, wherein the primary node includes a first and a second node.

26. The computer program product of claim 25, wherein the first node represents a first activity of the online character and the second node represents a second activity of the online character, wherein the first activity and the second activity occur substantially simultaneously in time.

27. The computer program product of claim 21, wherein the first pose occurs at a first time and the second pose occurs at a second time, later than the first time.

28. The computer program product of claim 21, wherein identifying the primary node includes selecting a node from a plurality of nodes representing the first pose.

29. The computer program product of claim 21, wherein primary node represents movement of the online character.

30. The computer program product of claim 21, wherein the online character is included in a video game.

* * * * *